United States Patent Office 2,777,839
Patented Jan. 15, 1957

2,777,839
GREY TRISAZO DYESTUFFS

Klaus Böckmann, Leverkusen, and Karl Taube, Leverkusen-Bayerwerk, Germany, assignors to Farbenfabriken Bayer Aktiengesellschaft, Leverkusen, Germany, a corporation of Germany No Drawing. Application April 7, 1954,
Serial No. 421,673

Claims priority, application Germany April 18, 1953

4 Claims. (Cl. 260—169)

The present invention relates to new grey trisazo dyestuffs and to a process of making the same; more particularly it relates to azo dyestuffs corresponding to the following general formula:

A—N=N—B—N=N—C—N=N—D wherein A stands for the radical of 1-amino-8-hydroxynaphthalene-sulfonic acid, B and C for middle components of the benzene or naphthalene series which may contain sulfonic acid groups, and D stands for a sulfonic acid of 2-amino-8-hydroxynaphthalene or 1-amino-7-hydroxynaphthalene or derivatives thereof.

The new trisazo dyestuffs are obtainable by coupling diazotized 1-amino-8-hydroxynaphthalene-sulfonic acids with an amine of the benzene or naphthalene series which may contain sulfonic acid groups and is capable of coupling in p-position to the amino group, diazotizing the aminoazo compound thus obtained and coupling it again with an amine of the benzene or naphthalene series which may contain sulfonic acid groups and is capable of coupling in p-position to the amino group, further diazotizing this amino disazo compound and coupling it in alkaline medium with a sulfonic acid of 2-amino-8-hydroxynaphthalene or 1-amino-7-hydroxynaphthalene or the derivatives thereof. As first diazo components may be mentioned by way of example 1-amino-8-hydroxynaphthalene-3-sulfonic acid, 1-amino-8-hydroxynaphthalene-3,6-disulfonic acid, as middle components 1-amino-2-methoxy-5-methylbenzene, 1-aminonaphthalene, 1-aminonaphthalene-6- or -7-sulfonic acid, and as final components 1-amino-7-hydroxynaphthalene-3-sulfonic acid, 2-amino-8-hydroxynaphthalene-3,6-disulfonic acid.

The new trisazo dyestuffs dye cotton and regenerated cellulose reddish to greenish grey shades of good dischargeability. Compared with known comparable dyestuffs which do not contain sulfonic acids of 1-amino-8-hydroxynaphthalene as initial component, the new dyestuffs are especially distinguished by a superior fastness to light.

The sulfonic acids of 1-amino-8-hydroxynaphthalene used in the present process are preferably first converted into their O-esters by reacting them with benzene or toluene sulfochloride and then diazotized. After the final coupling these esters are split by alkaline saponification.

The following examples illustrate the invention without, however, limiting it thereto; the parts being by weight:

Example 1

319 parts of 1-amino-8-hydroxynaphthalene-3,6-disulfonic acid are diazotized as O-ester of benzene sulfonic acid in known manner and coupled with 137 parts of 1-amino-2-methoxy-5-methylbenzene. The monoazo dyestuff is diazotized and combined with 143 parts of 1-aminonaphthalene. The disazo dyestuff thus obtained is further diazotized and added to 319 parts of 2-amino-8-hydroxynaphthalene-3,6-disulfonic acid in sodium carbonate alkaline solution. When the coupling is completed the dyestuff is saponified by heating with caustic soda solution. After neutralizing the trisazo dyestuff corresponding as free acid to the formula

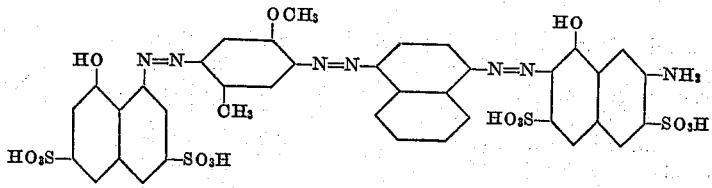

is isolated and dried. It is a brown-black powder easily soluble in water which dyes cotton and regenerated cellulose reddish grey shades fast to light.

Example 2

239 parts of 1-amino-8-hydroxynaphthalene-3-sulfonic acid are diazotized as O-ester of toluene sulfonic acid, coupled with 223 parts of 1-aminonaphthalene-7-sulfonic acid, further diazotized and then combined with 137 parts of 1-amino-2-methoxy-5-methylbenzene. The further diazotized disazo dyestuff is coupled with 319 parts of 2 - amino - 8-hydroxynaphthalene-3,6-disulfonic acid in aqueous pyridine solution. After the dyestuff is separated in acid medium, it is isolated, dissolved to a neutral solution and saponified by heating with diluted caustic soda solution. The trisazo dyestuff corresponding as free acid to the formula

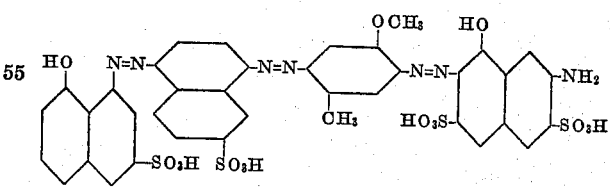

is then isolated under neutral condition and dried. The brown-black powder easily dissolves in water and dyes cotton and regenerated cellulose blue-grey shades fast to light and well dischargeable.

Example 3

319 parts of 1-amino-8-hydroxynaphthalene-3,6-disulfonic acid are diazotized as O-ester of benzene sulfonic acid, combined with 223 parts of 1-aminonaphthalene-7-sulfonic acid, further diazotized and coupled with 137 parts of 1-amino-2-methoxy-5-methylbenzene. The further diazotized disazo dyestuff is combined with 239 parts of 1-amino-7-hydroxynaphthalene-3-sulfonic acid in aqueous pyridine. Thereafter it is saponified by means of caustic soda solution, isolated and dried. The trisazo dyestuff corresponds as free acid to the formula

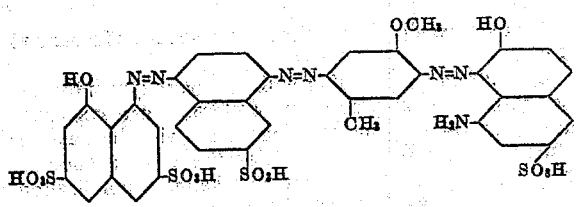

and is a grey-black powder easily soluble in water. It dyes cotton and regenerated cellulose greenish grey shades very fast to light and very well dischargeable.

We claim:

1. Trisazo dyestuffs corresponding as free acids to the general formula

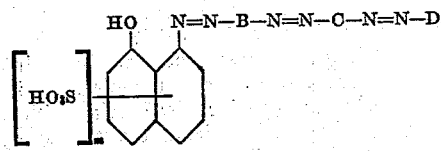

wherein B and C stand for radicals selected from the group consisting of radicals of the benzene and the naphthalene series bearing the —N=N— bridges in p-position to each other, with one of the radicals B and C being substituted by at least one and not more than two substituents of the group consisting of lower alkyl and lower alkoxy, and D stands for an amino-hydroxynaphthalene-sulfonic-acid selected from the group consisting of 1-amino-7-hydroxy- and 2-amino-8-hydroxynaphthalene-sulfonic acids bearing the —N=N— bridge in o-position the hydroxy group, $m$ being one of the integers 1 and 2.

2. Trisazo dyestuffs corresponding as free acids to the general formula

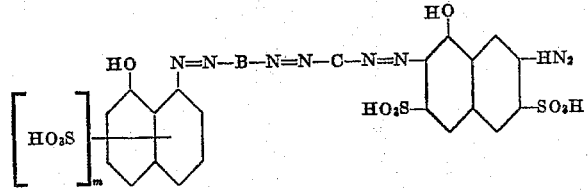

wherein B and C stand for radicals selected from the group consisting of radicals of the benzene and the naphthalene series bearing the —N=N— bridges in p-position to each other, with one of the radicals B and C being substituted by at least one and not more than two substituents of the group consisting of lower alkyl and lower alkoxy, $m$ being one of the integers 1 and 2.

3. Trisazo dyestuffs corresponding as free acids to the general formula

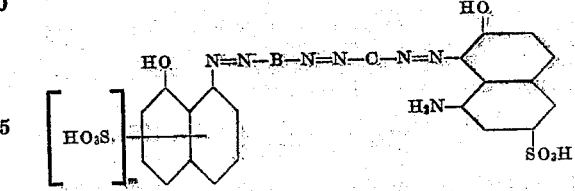

wherein B and C stand for radicals selected from the group consisting of radicals of the benzene and the naphthalene series bearing the —N=N— bridges in p-position to each other, with one of the radicals B and C being substituted by at least one and not more than two substituents of the group consisting of lower alkyl and lower alkoxy.

4. The trisazo dyestuff corresponding as free acid to the formula

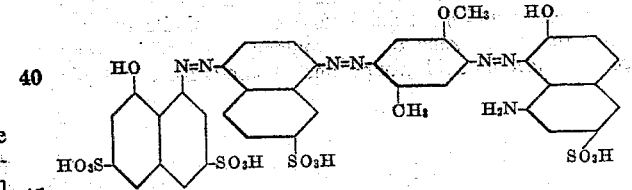

References Cited in the file of this patent

UNITED STATES PATENTS

| | | |
|---|---|---|
| 491,410 | Diehl | Feb. 7, 1893 |
| 1,819,080 | Dewey | Aug. 18, 1931 |

FOREIGN PATENTS

| | | |
|---|---|---|
| 5,484 | Great Britain | of 1908 |